United States Patent [19]
Stalsberg

[11] Patent Number: 5,304,781
[45] Date of Patent: Apr. 19, 1994

[54] TWO TERMINAL LINE VOLTAGE THERMOSTAT

[76] Inventor: Kevin J. Stalsberg, 2829 N. Riviera Dr., White Bear Lake, Minn. 55110

[21] Appl. No.: 980,983

[22] Filed: Nov. 24, 1992

[51] Int. Cl.$^5$ .............................................. H05B 1/02
[52] U.S. Cl. .................... 219/501; 219/508; 219/494; 219/519; 219/509; 236/78 A
[58] Field of Search ........... 219/491, 494, 497, 501, 210/508, 510, 509, 519; 236/46 R, 78 R, 78 A

[56] References Cited
U.S. PATENT DOCUMENTS
4,776,514 11/1988 Johnstone et al. .................. 219/510

*Primary Examiner*—Mark H. Paschall
*Attorney, Agent, or Firm*—Flehr, Hohbach, Test, Albritton & Herbert

[57] ABSTRACT

A two terminal line voltage thermostat includes a switch which connects one side of the line voltage to a heater load (that it drives) such as a baseboard heater with the other side of the heater being connected to the other side of the line. Common full wave rectifier components drives both a relay coil and the remaining electronics of the thermostat. In addition, an arc suppressing triac across the switch while necessarily connected to the primary side of a transformer is directly driven from the secondary which is ungrounded; the primary also provides choking for the triac.

6 Claims, 3 Drawing Sheets

TWO TERMINAL LINE VOLTAGE THERMOSTAT

FIELD OF INVENTION

The present invention relates to a two terminal line voltage thermostat and more particularly, to thermostats which drive heater loads such as electric baseboard types.

DESCRIPTION OF THE PRIOR ART

U.S. Pat. No. 4,776,514 shows a thermostat of the above type as installed, for example, in a domestic house. The thermostat has two terminals, one which is connected to one side of the line voltage and the other terminal to a heater load which is then connected to the other side of the line voltage. The thermostat itself contains a switch which must control large amounts of power and in addition some type of circuitry which enables the thermostat itself to be energized from the same line voltage source.

In addition to the natural aim of producing a low cost device, it is useful to produce a device which has low electronic power losses due to lower internal heating and also a more accurate device.

OBJECT AND SUMMARY OF INVENTION

It is a general object of the present invention to provide an improved two terminal line voltage thermostat. Line voltage is understood to mean the household current and voltage or other power supply that drives the heater load.

In accordance with the above object there is provided a two terminal line voltage thermostat including a switch for connecting the line voltage across a heater load connected to one of its terminals with the other of the two terminals connected to the line voltage. The thermostat comprises a transformer having voltage and current primary windings and a secondary winding, the switch in its closed condition energizing only the current winding and in its open condition energizing both of said primary windings. A relay coil actuates the switch and is connected to the current winding. Blocking capacitor means are connected to the voltage winding for providing a high impedance series circuit to the heater load with the switch open. Triac switch means are connected across the switch for arc suppression and also connected across the blocking capacitor means and the voltage winding for providing choking for the triac means. Temperature responsive means receive power from the secondary winding for actuating the relay coil.

DETAILED DESCRIPTION OF THE PREFERRED EMBODIMENT

Figure 1:
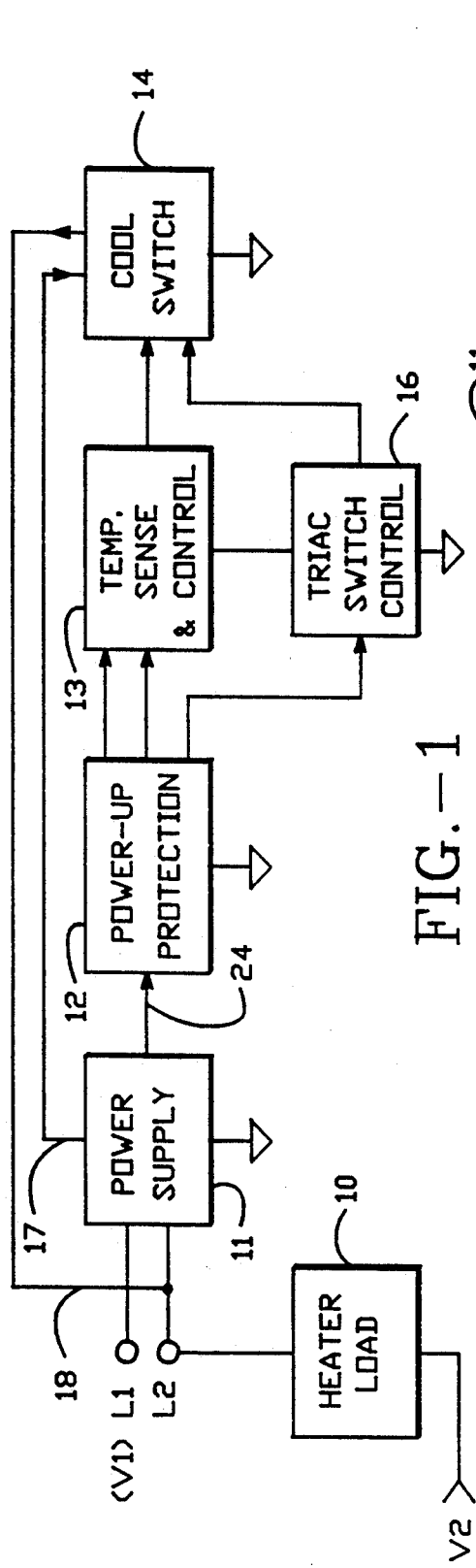
FIG. 1 is a block diagram embodying the present invention.

FIG. 1 shows the overall block diagram of the circuit of the present invention which is basically a two terminal line voltage thermostat with the terminals L1 and L2 for driving a heater load (for example, a baseboard heater) 10. A typical connection would be the terminal L1 connected to the one side of the line voltage supply V1, one side of the heater load connected to L2, and the other side of the heater load 10 connected to the V2 voltage; typically the household voltage of 120 or 240 volts which the thermostat is designed to handle. Power supply 11 in general provides for powering the rest of the circuit by stealing power from the heater load and provides for d.c. rectification and filtering to provide d.c. voltage power for the various integrated circuit components, provides for voltage regulation, and also provides transient protection.

The power-up protection unit 12 is used to inhibit or enable the temperature sense and control unit 13. That unit includes a temperature responsive device and, of course, an actual control knob set by the user of the thermostat to a desired temperature. Cool switch 14 is activated by unit 13 to complete a circuit to the heater load from the line 17 from power supply 11 which actually is closely coupled to the terminal L1, and the switch closing the circuit to line 18 which extends to L2 to in effect connect, as will be discussed in detail below, the line voltage across the heater load 10.

Triac switch control 16 relates in general to control of a triac arc suppressing switch which is placed across the cool switch unit 14 in a manner well known in the art as shown also by the above-mentioned patent.

There is an interrelationship between the various blocks and the general relationship is shown by the interconnecting lines. The exact relationship is clearly shown in FIGS. 2 through 6 which show detailed circuits of the functional blocks as shown in FIG. 1.

Figure 2:
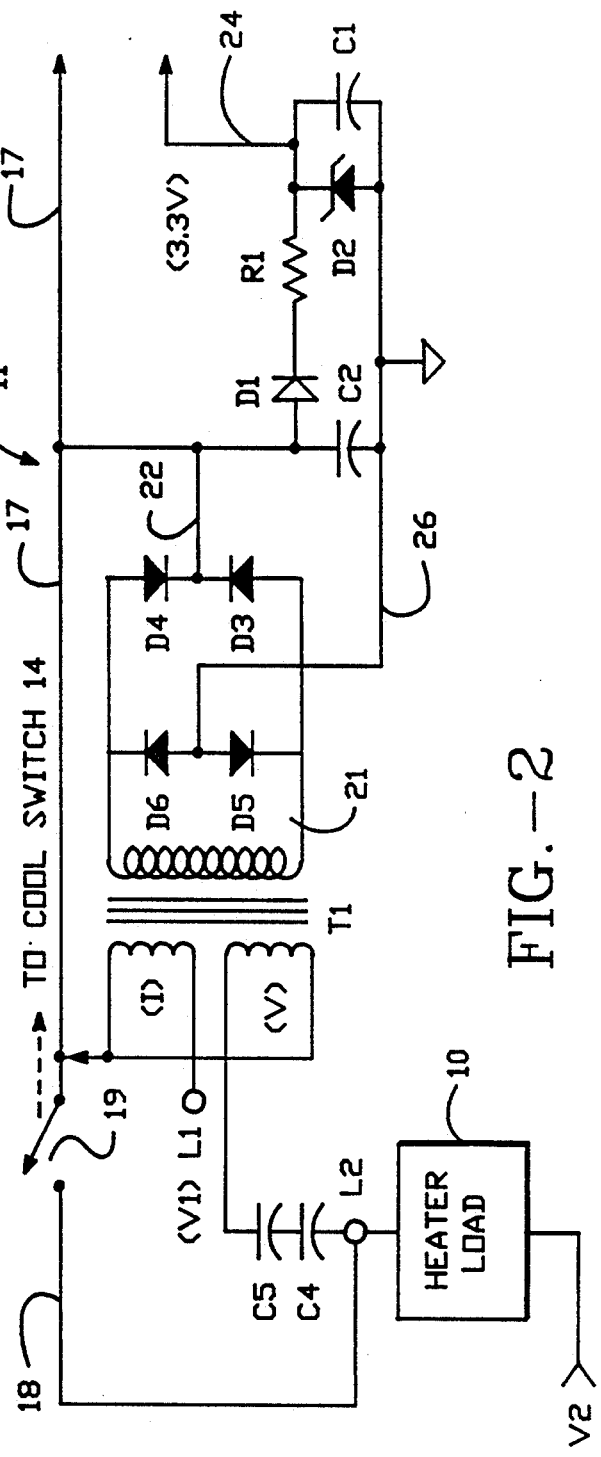
FIGS. 2 through 6 are circuit schematics respectively illustrating the various blocks shown in FIG. 1.

FIG. 2 illustrates the power supply 11; it also shows a switch 19 which is of the single pole single throw type which is functionally a portion of cool switch 14 as illustrated in FIG. 1 but is shown for convenience of understanding in FIG. 2. It will be illustrated again in the detailed circuit schematic of FIG. 6 of the cool switch block 14.

Power supply 11 includes a transformer T1 which has a two part primary winding consisting of a current, I, transformer type winding and a voltage, V, transformer type winding. Then there is a common secondary winding 21. The lines 17 and 18 are shown connected to the two terminals of switch 19 and FIG. 1 can be referred to for correlation. Thermostat terminal L2 is connected via the line 18 to the fixed terminal of switch 19 and terminal L1 to V1 of the line voltage which then extends through the current primary winding and to the line 17 which is on the other side of switch 19. Current winding I is connected in series with voltage winding V and then to blocking capacitors C4 and C5 which in turn are connected to terminal L2 and heater load 10.

Secondary winding 21, as will be discussed below, derives power from the two primary windings both in the heater ON and heater OFF modes (that is, with switch 19 closed and open respectively) and this power is rectified by a full wave bridge rectifier consisting of diodes D3, D4, D5 and D6. The d.c. output of the rectifier on line 22 is connected both to a filtering and regulator circuit 23 which produces on its output line 24 a nominal 3.3 volt regulated voltage which is used for powering the remainder of the circuitry. The other side of the bridge is the common line 26. The regulation circuit includes the Schottky diode D1 in series with resistor R1, capacitor C2 and the Zener diode D2 which is in parallel with the capacitor C1. Diode D2 does the actual regulation; C1 is a smoothing filter, and D1 prevents back discharge of C1. The actual d.c. voltage output on line 22 appears across the capacitor C2.

Very briefly in operation, with switch 19 in an open condition (that is, heater-off), the voltage winding of T1 and blocking capacitors C4 and C5 present a high series impedance to the line voltage across heater load 10. Thus the heater load current is limited to tens of milliamperes providing no perceptible heating of the heater load. The line voltage appears mainly across the voltage winding and the blocking capacitors C4 and C5. This primary voltage winding thus provides a voltage on the secondary winding 21 which is stepped down through transformer T1 and via full wave rectification and regulation becomes a d.c. power supply voltage on line 24.

With switch 19 closed (heater-on) the voltage winding and blocking capacitors C4, C5 are shorted by line 18, and thus the heater load current (which is now significant) is passed from terminal L1 to the current winding through switch 19 and then to the heater load 10. Since the current winding presents a very small impedance in series with the heater load 10, most of the line voltage and power appear across the heater. The load current (determined by the size of the heater) is stepped down through transformer T1 into secondary winding 21 and again provides the regulated d.c. voltage on line 24.

Figure 3:
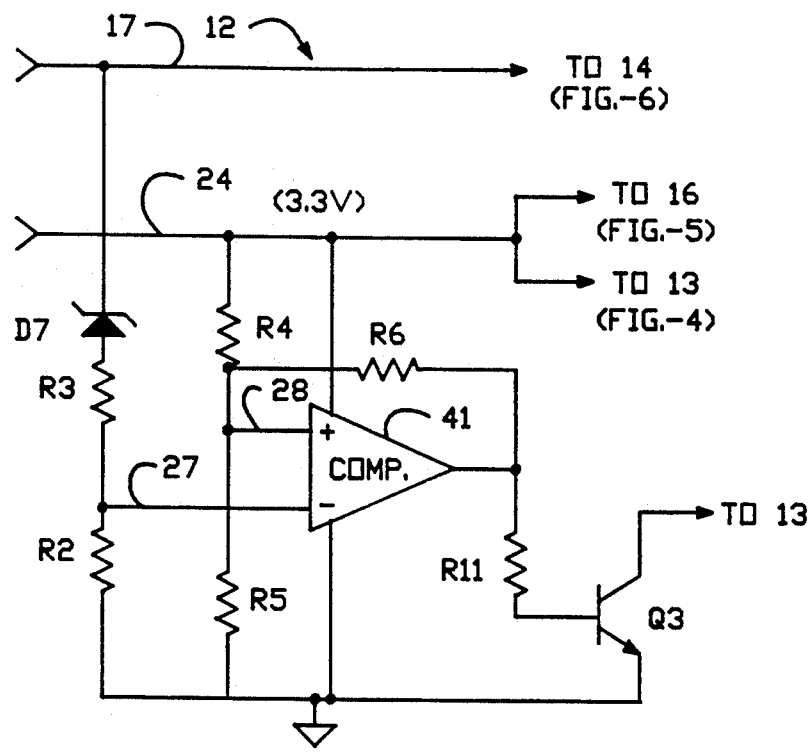

A second level of regulation is provided by a variable clamping voltage resulting from the nonlinear loads of R1 and D2 in FIG. 2, and loads of D7, R2, and R3 of FIG. 3. These nonlinear loads are critical in the heater-on mode since they minimize the power draw on transformer T1 when the heater load requires only low load current, and they clamp the T1 secondary voltage which appears on line 22 in power supply 11 when higher current levels are present in the secondary winding 21 due to high load current installations. In this way there is minimized power draw on transformer T1 and power losses (internal heating) from the rest of the electronics, over the full range of expected load currents.

Now also referring to FIG. 3, which is for power-up protection, the series resistors R2 and R3 and the Zener diode D7 are between line 17 and common. Thus the voltage on line 17 will have a range of 5.1 to 14 volts when switch 19 is closed and 9.6 to 14 volts when open, depending on line voltage, load current and circuit conditions. The voltage on line 17 which as clearly shown, referring to FIG. 6 briefly, drives the relay coil K1 (which actuates switch 19) and must be controlled to provide for adequate K1 coil pull-in voltage when transitioning from the heater-off to the heater-on mode. But it should never become excessive enough to damage the relay coil K1. Thus, given a relay coil voltage of 12 volts, it should be no less than 70% or no greater than 130% of the voltage. On the other hand, the minimum d.c. voltage on line 17 must be adequate to hold the contacts closed. This minimum hold voltage should be no less than 10% of the relay coil voltage of 12 volts. And from a practical standpoint, due to the limits of power dissipation on the regulation circuit components, the voltage across C2 (that is the voltage on line 17) must be in the range of greater than 5.1 volts and less than 14 volts. The circuit configuration of FIGS. 2 and 3 provides such voltage ranges. Thus a large range of heater loads including those that draw minimum power and those that draw maximum power may be tolerated.

It should be mentioned here parenthetically that the basic transformer technique with the voltage and current primaries to provide power to the various circuit components of the thermostat are disclosed in the above patent. However, the specific circuit connection of line 17 and the specific regulation circuits are not shown.

Referring again to FIG. 2, it should be noted that line 26 is referenced to a common (and thus ungrounded) as are the remainder of the circuit blocks illustrated in FIG. 1. This is necessary since the line 17 is directly connected to the current primary I of transformer T1. And thus any alternating voltage appearing on line 17 must be isolated.

FIG. 3 illustrates the power protection unit 12 which as discussed above is used to inhibit or enable the temperature sense unit 13. In general the temperature sense electronics does not enable until the voltage on line 17 exceeds 9.6 volts d.c. and the temperature sense unit 13 will stay enabled until the voltage drops below 4.8 volts. Power protection unit 12 includes the compare amplifier U1 which is part of an operational amplifier quad unit including amplifiers U2, U3 and U4 which are utilized in other portions of the circuit to be described below. Such operational amplifier quad unit is sold under the Model No. LM324. The output of the full wave bridge circuit on line 22 which appears on line 17 is divided down by the Zener diode D7 and resistors R3 and R2; these components as discussed above also support the voltage regulation function of the power supply of FIG. 2. Center tap 27 drives the negative terminal of operational amplifier U1. The voltage on line 27 is compared with the positive input 28 which senses a resistive division provided by resistors R4 and R5 of the regulated d.c. voltage on line 24. Positive feedback through R6 connected between the input and output of U1 establishes a hysteresis band between 4.8 volts and 9.6 volts on the voltage that appears on line 17. Resistor R11 limits the base current drive to transistor Q3. Amplifier U1 (along with the remaining quad amplifiers U2, U3, and U4) is powered across line 24 and common.

Transistor Q3 disables the temperature sensing and control unit 13 when the transistor is on and enables the unit when the transistor is off. At the initial power-on, when the circuit is initialized, it is unknown whether or not an immediate call for heat will occur; thus, the power protection unit 12 inhibits the call for heat until a sufficient voltage level, specifically 9.6 volts on line 17 is present. This guarantees that the relay coil K1 will pull in the switch. Triac gate (referring to FIG. 6) across Q2 used for arc suppression across switch 19, will not be pulsed prematurely and the contact of switch 19 closed at some later time to thus maintain the arc suppression or snubbing function of triac. Once the voltage level has been exceeded and the temperature sensing unit enabled, such electronics will stay enabled until the voltage on line 17 drops below 4.8 volts. This allows for the lower d.c. voltage levels that can be experienced in the heater-on mode, yet forces the power-up sequence if the voltage levels drop.

Figure 4:
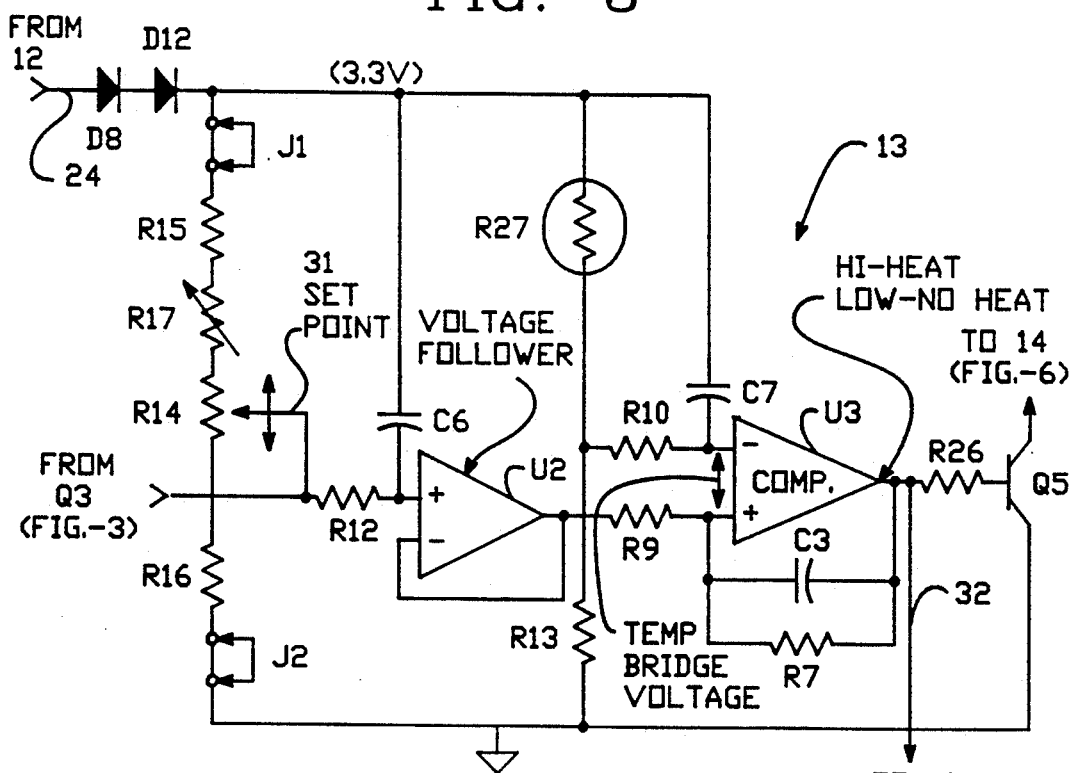

FIG. 4 illustrates temperature sense and control unit 13 which receives on line 24 (from FIG. 3) a nominal 3.3 V voltage and via the diodes D8 and D12 drops the supply voltage to a nominal 2.3 volts. This is lower than the 3.3 volts used to supply, as illustrated in FIG. 3, the operational amplifier U1 (and the other operational amplifier/comparators U2 through U4) which allows the limited U2 output voltage range (in FIG. 4) to fully represent possible input voltages; that is, U2 output will not be clipped when the largest expected input voltages appear at the input of U2.

Relative temperature sensing is accomplished via a four leg bridge circuit. Half of the bridge which includes series connected resistors R14 through R17 which represent the temperature set point, the other half of the bridge, which includes resistors R13 and R27, representing the sensed temperature. R27 is a temperature sensing resistor (thermistor) and R13 a normal resistor. The center tap between these two resistors feeds the negative input of comparator U3 via resistor R10. The center tap of the set point potentiometer R14 (this is the unit controlled by the user of the thermostat) is enabled from the output of Q3 as discussed above, and the filter network including the series resistor R12 and capacitor C6 drives a voltage follower unit U2 connected through R9 to the positive input of comparator U3.

Thus as illustrated across the positive and negative inputs of comparator U3 is a voltage provided by the temperature bridge.

R12 and C6 form a low pass filter network which provides a corner frequency of approximately 0.3 Hz. and prevents possible device stress due to excessive on/off rates caused by rapidly moving the set point knob 31 about the actual sensed temperature switching point. For the other half of the bridge including temperature sensing unit R27, there is low pass filtering provided by capacitor C7 and resistor R10 having a corner frequency that ranges from 0.17 Hz. to 0.3 Hz. This range is due to the change in resistance of the thermistor R27. Such low pass filter slows down the response of this bridge half to changes in the value of R27 that result from short-lived temperature swings in the room air; for example, someone walking by the thermostat. The corner frequencies of the two filters are kept relatively close to each other so that both bridge halves respond to changes in roughly the same time frame.

The filtered bridge voltage is input to comparator U3 which provides a hysteresis feedback implemented by resistor R7 and capacitor C3 connected between the output and positive input. This establishes a temperature sensing dead band and cycle rate. Therefore a high output on line 32 of U3 provides heat by closing switch 19 by actuating via resistor R26, transistor Q5 and a low level leaves the switch open for no heat.

Referring to the R14-R16 half of the bridge circuit of FIG. 4, R17 is actually a calibration potentiometer. This is utilized when the temperature sense unit is first constructed to correct mechanical misalignment of the set point potentiometer R14 and resistor component intolerances; in other words, the middle of the range of the set point knob 31 of potentiometer R14 should occur at a nominal temperature such as 68° F.

Specifically the process of adjusting includes the steps of removing the jumpers J1, J2 from the two legs. The set point knob 31 is centered at the nominal 68° F. or some other fixed nominal centered temperature. Then an ohmmeter is attached to the set point 31 and the other end of R16 at the jumper J2 and the resistance read. Then the ohmmeter is connected to read the resistance between line 31 and the other end of R15, then R17 is adjusted to the read resistance.

Figure 5:
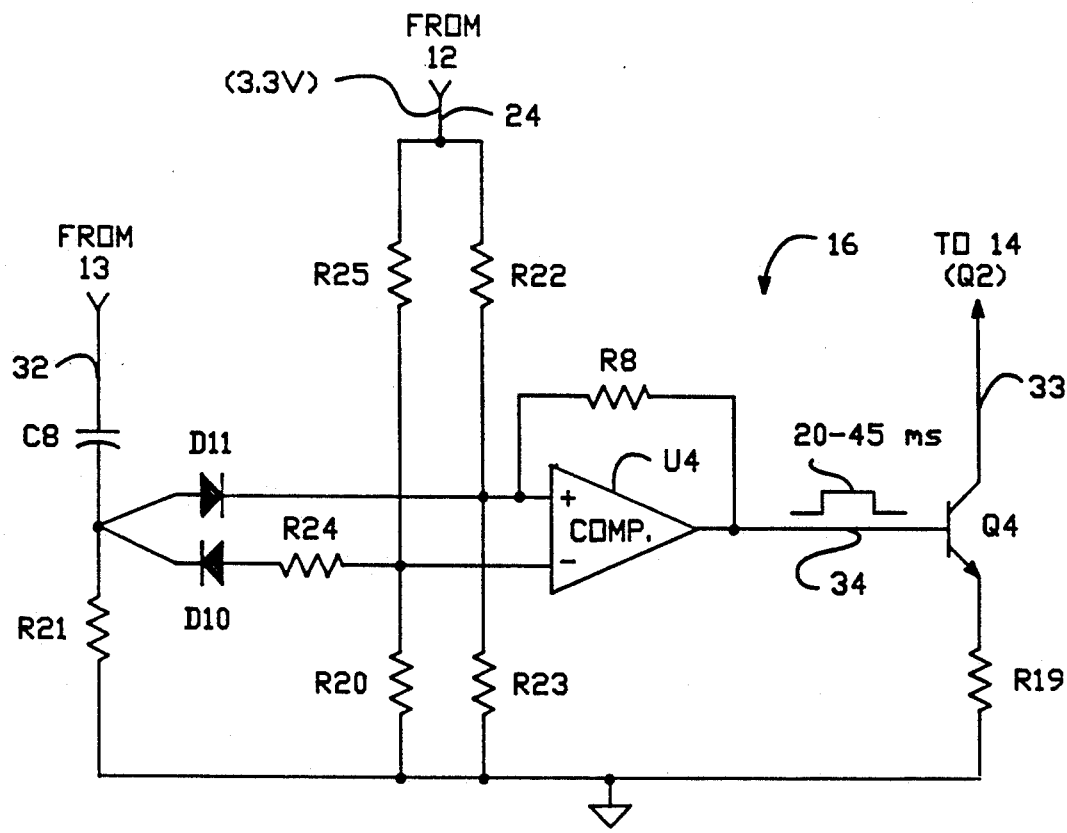
Figure 6:
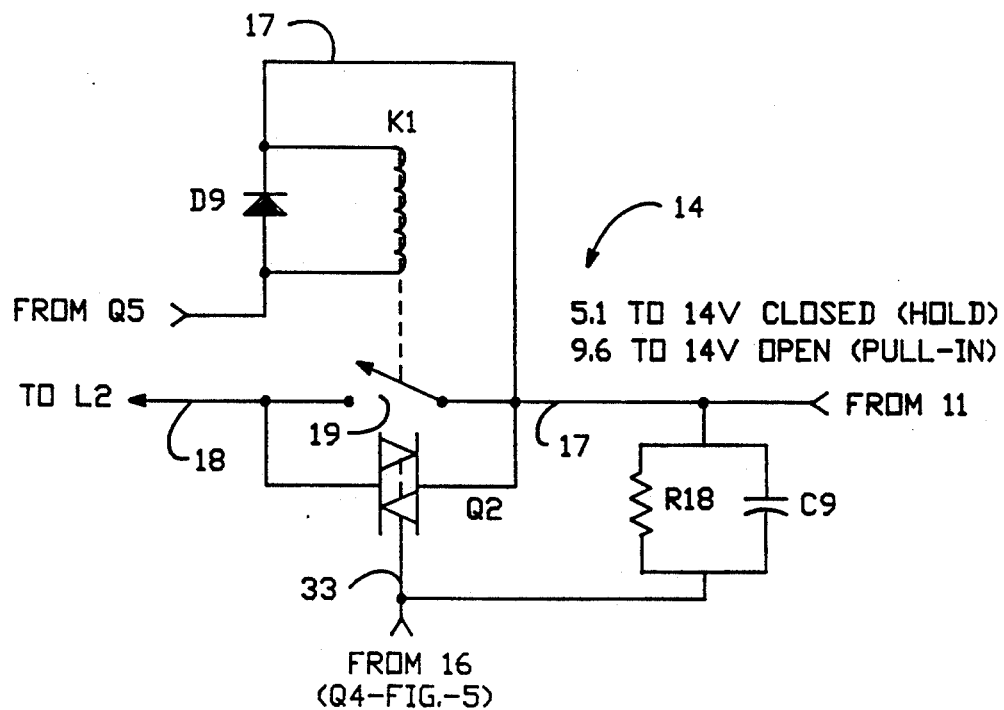

Referring now to cool switch 14 in FIG. 6, the K1 relay coil discussed above and switch 19 are ganged with a triac Q2. The triac is connected across the contacts of switch 19 and is activated (by the circuit of FIG. 5 as will be explained in detail below) during the open/close and close/open transitions of the relay contacts. Because the triac snubs the relay switch contacts at these on/off transitions, the continuous current capability of the relay is much greater than its related turn-on and turn-off current. Thus the relay utilized in the circuit can be rated relatively lower than expected. The relay coil K1 is actually driven from transistor Q5 (see FIG. 4) which when Q5 is on, returns one side of the coil to common. The other side of the relay coil is driven from the line 17 which, referring to FIG. 2, is the voltage across capacitor C2 and is derived from the full rectification. This line has a voltage range provided by the above described regulation of 5.1 to 14 volts when the relay is closed or in a hold mode or 9.6 to 14 volts when it is in an open or pull-in mode. A flyback diode D9 across the K1 coil prevents high transient voltages.

Triacs such as Q2 to suppress arcs are in general well known as illustrated or discussed in the cited patent. Since the triac is across switch 19, the entire triac for proper functioning is thus necessarily tied to the primary. But its gate control input on line 33 may operate from the switch control circuit 16 without any optical isolation (see the previous cited patent). This is partially achieved by the referencing of the secondary winding 21 to the primary winding by the connection of the line 17 to the primary current coil I as illustrated in FIG. 2. With this electrical connection all of the circuit blocks 11 through 16 as illustrated in FIG. 1 must be connected to the common, as illustrated by a triangle, and of course not be grounded. At the same time the triac switching unit Q2 normally requires an additional snubbing and/or choking unit to suppress transients and high currents while it is performing the arc suppression function on switch 19. But it needs no additional such unit since when switch 19 is closed, the voltage coil V of transformer T1 and the capacitors C4 and C5 provides such a function; this is because as clearly apparent in FIG. 2 these are parallel with the switch 19 and thus in parallel with triac Q2.

The final block of the control circuit of the thermostat unit is the triac switch control unit 16 of FIG. 5 by which its transistor Q4 drives the gate 33 of triac Q2 for a period of from 20 to 45 milliseconds which is the on/off times of the switch.

In general, the control pulse indicated on the input line to the transistor Q4 is generated by using an RC discharge characteristic to influence a biased hysteresis compare operation. Specifically the output 32 from comparator U3 (FIG. 4) drives the RC combination of R21 and C8. Through the parallel connected diodes D11 and D10 and the resistor R24, these drive the positive and negative inputs of a comparator U4. Bias is provided by resistors R20, R22, R23 and R25 which receive on line 24 a nominal 3.3 volts. This bias is adjusted so as to guarantee a comparison output on the output 34 of 0 volts when C8 and R21 are in a d.c. steady state condition; that is, the negative compare input at U4 is at a greater positive voltage than the positive compare input. When C8 is charging, the positive input is temporarily elevated in voltage causing a temporary positive voltage output on line 34. When C8 is discharging, the negative compare input is temporarily dropped in voltage causing a temporary positive voltage output on line 34. Resistor R8 provides positive feedback establishing on/off operation.

In operation, the pulse input at the gate of transistor Q4 thus causes transistor Q4 in combination with the resistor R19 to operate as a current source. When the current source is on it pulls current out of the triac gate across Q2 and through parallel connected resistor R18 and capacitor C9 to turn the triac on. Thus arc suppression is accomplished.

In summary the configuration of the present circuit and the connection of the relay activation line 17 allows the single throw single pole switch 19 to be utilized. Such relays are less expensive than single pole double throw relays and operational parameters are less critical. The switching configuration also allows a dual use of the blocking capacitors C4, C5 illustrated in FIG. 2 along with the voltage coil to serve all the blocking functions necessary for the power sharing and/or the power stealing concept and also provides for snubbing or choking of the arc suppression triac Q2.

The relay coil voltage provided on line 17 is derived from the same full wave rectifier as the voltages for operating the comparators U1 through U4. This is a saving in components.

The triac drive circuitry and circuit referencing has been arranged to allow direct drive (non-isolated) of the triac Q2 gate. Finally the temperature sensing bridge unit illustrated in FIG. 4 requires only a single thermistor component R27 rather than an additional compensating component and allows for effective calibration by the procedure described. Additionally, filtering in the temperature sense bridge is modified to expand the utility of the operational amplifier to the direct drive of the triac Q2. Thus an improved two terminal line voltage thermostat has been provided.

What is claimed is:

1. A two terminal line voltage thermostat including a switch for connecting said line voltage across a heater load connected to one of its terminals with the other of the two terminals connected to said line voltage said thermostat comprising:
   a transformer having voltage and current primary windings and a secondary winding said switch in its closed condition energizing only said current winding and in said open condition energizing both of said primary windings;
   a relay coil for actuating said switch and connected to said current winding;
   blocking capacitor means connected to said voltage winding for providing a high impedance series circuit to said heater load with said switch open;
   triac switch means connected across said switch for arc suppression, said switch being single pole-single throw;
   and temperature responsive means receiving power from said secondary winding for actuating said relay coil.

2. A thermostat as in claim 1 including a full wave bridge rectifier having a common d.c. output connected to said secondary winding and providing power via said d.c. output to both said temperature responsive means and said relay coil.

3. A thermostat as in claim 1 where said temperature responsive means includes a bridge circuit having four legs with one leg having a temperature sensing element in series with a resistor in another leg, and the remaining two legs forming a voltage divider network with calibrating potentiometer means in series with a set point potentiometer, said calibrating potentiometer means adjusting for mechanical misalignment of said set point potentiometer and resistor component tolerances.

4. A thermostat as in claim 3 including the process of adjusting said calibrating potentiometer comprising the steps of
   a) removing jumpers from the ends of said remaining two legs,
   b) centering said set point potentiometer at 68° F. or some other fixed nominal center temperature,
   c) reading with ohmmeter the resistance between the center top of said set point potentiometer and the end of the leg without the calibrating potentiometer, and
   d) with said ohmmeter connected to the end of the other leg adjusting said calibrating potentiometer for the same previous read resistance.

5. A thermostat as in claim 2 where said common d.c. output is electrically connected and referenced to said primary current winding to allow direct drive of said triac means.

6. A two terminal line voltage thermostat including a switch for connecting said line voltage across a heater load connected to one of its terminals with the other of the two terminals connected to said line voltage said thermostat comprising:
   a transformer having voltage and current primary windings and a secondary winding said switch in its closed condition energizing only said current winding and in said open condition energizing both of said primary windings;
   a relay coil for actuating said switch and connected to said current winding;
   blocking capacitor means connected to said voltage winding for providing a high impedance series circuit to said heater load with said switch open;
   triac switch means connected across said switch for arc suppression and also connected across said blocking capacitor means and said voltage winding for providing choking for said triac means;
   temperature responsive means receiving power from said secondary winding for actuating said relay coil;
   a full wave bridge rectifier having a common d.c. output connected to said secondary winding and providing power via said d.c. output to both said temperature responsive means and said relay coil, said common d.c. output being electrically connected and referenced to said primary current winding to allow direct drive of said triac means.

* * * * *